United States Patent [19]

Ho et al.

[11] Patent Number: 4,961,873

[45] Date of Patent: Oct. 9, 1990

[54] ABSORBENT COMPOSITION CONTAINING A SEVERELY-HINDERED AMINE MIXTURE WITH AMINE SALTS AND/OR AMINOACID ADDITIVES FOR THE ABSORPTION OF $H_2S$

[75] Inventors: W. S. Winston Ho; Guido Sartori, both of Annandale; Eugene L. Stogryn, Edison, all of N.J.

[73] Assignee: Exxon Research and Engineering Company, Florham Park, N.J.

[21] Appl. No.: 398,346

[22] Filed: Aug. 24, 1989

Related U.S. Application Data

[63] Continuation of Ser. No. 106,782, Oct. 13, 1987, abandoned.

[51] Int. Cl.$^5$ .............................................. C09K 3/00
[52] U.S. Cl. ..................................... 252/189; 252/190; 252/191
[58] Field of Search ..................... 252/182.14, 182.17, 252/189, 190

[56] References Cited

U.S. PATENT DOCUMENTS

| | | | |
|---|---|---|---|
| 3,848,057 | 11/1974 | Leder et al. | 252/192 |
| 4,112,051 | 9/1978 | Sartori et al. | 252/189 |
| 4,217,238 | 8/1980 | Sartori et al. | 252/192 |
| 4,240,922 | 12/1980 | Sartori et al. | 252/189 |
| 4,240,923 | 12/1980 | Sartori et al. | 252/189 |
| 4,405,579 | 9/1983 | Sartori et al. | 252/189 |
| 4,405,580 | 9/1983 | Stogryn et al. | 252/190 |
| 4,405,581 | 9/1983 | Savage et al. | 252/190 |
| 4,405,583 | 9/1983 | Stogryn et al. | 252/190 |
| 4,405,585 | 9/1983 | Sartori et al. | 252/189 |
| 4,508,692 | 4/1985 | Savage et al. | 252/189 |
| 4,525,294 | 6/1985 | Sartori et al. | 252/182 |
| 4,618,481 | 10/1986 | Heinzelmann et al. | 252/189 |
| 4,892,674 | 1/1990 | Ho et al. | 252/189 |
| 4,894,178 | 1/1990 | Ho et al. | 252/189 |
| 4,894,179 | 1/1990 | Sartori et al. | 252/189 |
| 4,895,670 | 1/1990 | Sartori et al. | 252/189 |

*Primary Examiner*—Edward A. Miller
*Attorney, Agent, or Firm*—Ronald D. Hantman

[57] ABSTRACT

The present invention relates to a new alkaline absorbent solution that reduces the $H_2S$ content in a treated gas to below 10 vppm. The absorbent solution contains two severely-hindered amines, such as bis(tertiarybutylaminoethoxy)-ethane (BTEE) and ethoxyethoxyethanol-tertiarybutylamine (EEETB), a severely hindered amine salt, and/or a severely hindered aminoacid. This invention also describes a process for the removal of $H_2S$ from fluid mixtures using this absorbent solution to produce a very low level of $H_2S$ in the treated fluid. The process is also suitable for the selective removal of $H_2S$ from fluid mixtures comprising $H_2S$ and $CO_2$.

12 Claims, 11 Drawing Sheets

ABSORBENT COMPOSITION CONTAINING A SEVERELY-HINDERED AMINE MIXTURE WITH AMINE SALTS AND/OR AMINOACID ADDITIVES FOR THE ABSORPTION OF H2S

This application is a Rule 60 Continuation of U.S. Ser. No. 106,782 filed Oct. 13, 1987, now abandoned.

FIELD OF THE INVENTION

This invention relates to an absorbent composition and a process for the selective removal of hydrogen sulfide from a hydrogen sulfide-containing gas using the absorbent composition.

BACKGROUND OF THE INVENTION

Processes for the selective absorption of $H_2S$ from gaseous mixtures utilizing alkaline liquid absorbent containing amino compounds are known.

It is also known to use a liquid absorbe containing a severely hindered amino compound for the selective removal of hydrogen sulfide from normally gaseous mixtures. See, for example, U.S. Pat. No. 4,405,585 in which the severely hindered amine is a secondary ether alcohol such as the ones claimed in U.S. Pat. No. 4,471,138, and U.S. Pat. No. 4,405,583 in which the severely hindered amino compound is a di-secondary aminoether, the teachings of all of these patents are hereby incorporated by reference.

Although the alkaline absorbents containing the amino compounds are capable of removing acidic gases such as hydrogen sulfide from hydrogen sulfide-containing gaseous mixture, it is progressively more difficult particularly at low pressures to remove hydrogen sulfide at normal operating conditions to a level such that the absorbent-treated gaseous mixture (i.e., exit gas) contains less than about 10 volume parts per million (vppm) hydrogen sulfide. When it is desired to produce a gas having less then 10 vppm hydrogen sulfide, the treated gas, for example, a Claus tail gas, containing more than 10 vppm hydrogen sulfide is typically incinerated to convert the remaining hydrogen sulfide to $SO_2$. Therefore, it would be advantageous to improve the efficiency of the known alkaline amine absorbents to increase the amount of hydrogen sulfide that they are capable of removing at normal operating conditions so as to yield a treated gas having less than about 10 vppm, preferably less than 1 vppm, hydrogen sulfide.

J. H. Dibble's European Patent Application 84107586.4 (Publication No. 0134948) published March 27, 1985 discloses that the absorption of hydrogen sulfide at low pressures by certain alkaline absorbents, which may contain an alkanolamine, is enhanced by using in the absorbent an acid or an acid-forming material having a pKa of 6 or less in an amount sufficient to protonate less than 22% of the alkaline material to produce a treated gas having less than 10 vppm hydrogen sulfide.

U.S. Pat. No. 4,618,481 issued Oct. 21, 1986 to Exxon Research and Engineering Company discloses the absorption of hydrogen sulfide by the use of an alkaline absorbent composition comprising a severely hindered amine and an amine salt to produce a treated gas having less than 10 vppm hydrogen sulfide.

U.S. Pat. No. 4,153,674 discloses the addition of strong acidic compounds such as acids and ammonium salts thereof to aqueous alkanolamine absorbent solutions, see column 6, lines 33 to 48.

U.S. Pat. No. 2,722,500 discloses removing acid gases from hydrocarbon gases by using an alkanolamine salt of a polybasic acid having a high ionization constant, for example, phosphoric acid, and hydrochloric acid. It discloses that it is convenient to react the acid in advance with the amine.

U.S. Pat. No. 3,139,324 discloses an absorbent solution for $H_2S$ comprising an ethanolamine and a polybasic acid such as phosphoric acid. The ethanolamine is present in an amount between 0.20 gram mole and 0.02 gram mole per liter.

U.S. Pat. No. 3,848,057 discloses an absorbent solution comprising ethanolamine and a basic salt. The acid gases may contain $H_2S$ and $SO_2$.

U.S. Pat. No. 4,080,423 discloses a process for absorbing acidic gases using a basic component and a weakly dissociated compound such as a weak acid or a salt thereof. Acids and salts listed as suitable include phosphoric acid, and sulfurous acid. As shown in Example 1, the basic component may be ethanolamine and the salt can be sodium phosphate, and the acid gas to be purified may comprise $H_2S$ and $SO_2$.

It now has been found that a treated gas having less than 10 vppm $H_2S$ can be obtained from a low pressure gas and that in treating fluids comprising $H_2S$ as well as $CO_2$, an increasing $H_2S$ selectivity can be achieved by utilizing an absorbent composition comprising an alkaline severely hindered amine mixture in combination with its salts with a strong acid or in combination with a severely hindered aminoacid.

SUMMARY OF THE INVENTION

The present invention is a new alkaline absorbent containing:

(a) a mixture of two severely hindered amines with the following formulas:

and with x being an integer ranging from 2 to 6 [for example, a mixture of bis(tertiarybutylaminoethoxy)-ethane (BTEE) and ethoxyethoxyethanol-tertiarybutylamine (EEETB)], (b) an amine salt, said amine salt is the reaction product of (a) (for example, BTEE/EEETB) or an amine selected from the group consisting of a severely hindered amino compound having a cumulative $-E_s$ value (Taft's steric hindrance constant) greater than 1.75, a tertiary amine and mixtures thereof, and a component selected from the group consisting of an acid having at least one pKa of not more than about 7, a decomposable salt of an acid having at least one pKa of not more than about 7, a compound capable of forming an acid having a pKa of not more than about 7 and mixtures thereof, and/or (c) a severely hindered aminoacid having a cumulative $-E_s$ value greater than 1.75. Another aspect of the present invention is the use of the above solution to selectively remove $H_2S$ from gaseous streams down to levels of 10 vppm or lower. Use of the above solution leads to higher selectivity for $H_2S$ than observed when the severely hindered amine mixture is used alone without the severely hindered amine salt and/or aminoacid.

DETAILED DESCRIPTION OF THE INVENTION

The present invention includes a new absorbent solution containing (a) a mixture of two severely hindered amines with the following formula:

with x being an integer ranging from 2 to 6 and the weight ratio of the first amine to the second amine ranging from 0.43:1 to 2.3:1 [for example, a mixture of bis(tertiarybutylaminoethoxy)-ethane (BTEE) and ethoxyethoxyethanol-tertiarybutylamine (EEETB)], (b) an amine salt, said amine salt is the reaction product of (a) (for example, BTEE/EEETB) or an amine selected from the group consisting of an alkaline severely hindered amino compound having a $-E_s$ value (Taft's steric hindrance constant as calculated from the values given for primary amines in Table V of D. F. DeTar, Journal of Organic Chemistry, 45, 5174 (1980)) greater than 1.75 such as ethoxyethanol-tertiarybutylamine (EETB), a tertiary amino compound selected from the group consisting of tertiary alkanolamines, such as tertiary diethanolamines (e.g., methyldiethanolamine, i.e., MDEA), triethanolamine and mixtures thereof, and (b) a strong acid, or a thermally decomposable salt of a strong acid, i.e., ammonium salt, or a component capable of forming a strong acid, and mixtures thereof, and/or

(c) a severely hindered aminoacid having a cumulative $-E_s$ value greater than 1.75. Another aspect of the present invention is the use of the above solution to selectively remove $H_2S$ from gaseous streams down to levels of 10 vppm or lower, thereby making unnecessary the use of an incinerator or a Stretford unit downstream from the amine scrubber. Use of the above solution leads to higher selectivity for $H_2S$ than observed when the severely hindered amine mixture is used alone without the severely hindered amine salt and/or aminoacid.

Severely hindered amines whose salts are suitable additives according to the present invention correspond to the general formula:

wherein $R_1$ is selected from the group consisting of primary alkyl having 1 to 8 carbon atoms and primary hydroxy alkyl radicals having 2 to 8 carbon atoms, branched-chain alkyl and branched-chain hydroxy alkyl radicals having 3 to 8 carbon atoms and cycloalkyl and hydroxy cycloalkyl radicals having 3 to 8 carbon atoms, $R_2$, $R_3$, $R_4$ and $R_5$ are each independently selected from the group consisting of hydrogen, $C_1$-$C_4$ alkyl and $C_1$-$C_4$ hydroxy alkyl radicals, with the proviso that when $R_1$ is a primary alkyl or hydroxy alkyl radical, both $R_2$ and $R_3$ bonded to the carbon atom directly bonded to the nitrogen atom are alkyl or hydroxy alkyl radicals and that when the carbon atoms of $R_1$ directly bonded to the nitrogen atom is secondary at least one of $R_2$ or $R_3$ bonded to the carbon atom directly bonded to the nitrogen atom is an alkyl or hydroxy alkyl radical, x and y are each positive integers independently ranging from 2 to 4 and z is a positive integer ranging from 1 to 4.

Specific non-limiting examples of the severely hindered secondary amino ether alcohols include the following compounds:

Ethoxyethanol-tertiarybutylamine (EETB)

-continued

CH₃—C(CH₃)(CH₃)—NH—CHCH₂—O—CH₂CH₂—OH with CH₃ on CH
2-(2-tertiarybutylamino)propoxyethanol CH₃—CH(CH₃)—NH—CH(CH₃)—CH₂O—CH₂OH
2-(2-isopropylamino)propoxyethanol CH₃CH₂—C(CH₃)(CH₃)—NH—CH₂CH₂—O—CH₂CH₂OH
Tertiaryamylaminoethoxyethanol CH₃CH₂C(CH₃)(CH₂CH₃)—NH—CH₂CH₂OCH₂CH₂OH
(1-methyl-1-ethylpropylamino)ethoxyethanol The severely hindered amino compounds of said amine salts used in the process of the present invention have a pKa value at 20° C. greater than 8.6, preferably greater than 9.5 and most preferably the pKa value of the amino compound will range between about 9.5 and 10.6. If the pKa is less than 8.6, the reaction with H₂S is decreased whereas if the pKa of the amino compound is much greater than about 10.6, an excessive amount of steam is required to regenerate the solution. Also, to insure operational efficiency with minimal losses of the amino compounds, the amino compound should have a relatively low volatility. For example, the boiling point of the amine (at 760 mm) is typically greater than about 180° C., preferably greater than 200° C. and more preferably greater than 225° C.

Another group of severely hindered amines whose salts can be used as additives are diaminoethers, such as bis(tertiarybutylaminoethyl)ether and 1,2-bis-(tertiarybutylaminoethoxy)ethane.

The amine salt suitable for use as component of the absorbent of the present invention is the reaction product of (a) an amine selected from the group consisting of an alkaline severely hindered amino compound having a $-E_s$ value greater than 1.75 such as the compounds described above, and (b) a strong acid, or a thermally decomposable salt of a strong acid, i.e., ammonium salt, or a component capable of forming a strong acid, and mixtures thereof.

The acid or thermally decomposable salt, such as the ammonium salt, or an acid forming component, used as reactant to form the amine salt is a strong acid having at least one pKa of not more than about 7, preferably a pKa of not more than 6, more preferably a pKa of less than 5. The term "pKa" with reference to the acid is used herein to designate the logarithm of the reciprocal of the ionization constant of the acid measured at 25° C. When the acid is a polybasic acid, and therefore, has several ionization constants, at least one of the pKa must be not more than 7. Ionization constants are given in Lange's *Handbook of Chemistry* published by Handbook Publishers, Sandusky, Ohio, 1952, pages 1229-1235. The component reacted with the alkaline severely hindered amino compound to form the amine salt may be a strong acid, a salt of a strong acid, the cation of which will decompose, such as ammonium salts of strong acids, or a precursor of a strong acid. Suitable strong acids include inorganic acids such as sulfuric acid, sulfurous acid, phosphoric acid, phosphorous acid, pyrophosphoric acid; organic acids such as acetic acid, formic acid, adipic acid, benzoic acid, etc. Suitable salts of these acids include the ammonium salts, for example, ammonium sulfate, ammonium sulfite, ammonium phosphate and mixtures thereof. Preferably ammonium sulfate (a salt) or SO₂ (a precursor of an acid) is used as reactant. Suitable amine salts are those that are non-volatile at conditions used to regenerate the absorbent composition.

The amine salt may be preformed and then added in appropriate ratio to the unreacted (free) severely hindered amino compound or the amine salt may be formed by reacting the strong acid or precursor thereof with the hindered amino compound in such proportions as to maintain the desired ratio of unreacted severely hindered amino compound and in-situ produced amine salt.

A sufficient amount of severely hindered amine salt is present in the initial fresh or regenerated absorbent composition to provide at least about a mole ratio of 0.1:1 of said amine salt to the unreacted severely hindered amine mixture, preferably a mole ratio ranging from about 0.1:1 to 4:1, more preferably from about 0.2:1 to 1:1, most preferably from about 0.3:1 to 1:1 of said amine salt per mole of said unreacted severely hindered amine mixture.

Examples of severely hindered aminoacid are N-tertiarybutylalanine and N-tertiarybutylglycine A sufficient amount of severely hindered aminoacid is present in the initial fresh or regenerated absorbent composition to provide at least about a mole ratio of 0.01:1 of said aminoacid to the unreacted severely hindered amine mixture, preferably a mole ratio ranging from about 0.1:1 to 4:1, more preferably from about 0.2:1 to 1:1, most preferably from about 0.3:1 to 1:1 of said aminoacid per mole of said unreacted severely hindered amine mixture.

The severely hindered amine mixture (for example, BTEE/EEETB) and severely hindered amine salt and/or aminoacid additives are dissolved in a liquid medium. In a fresh or regenerated initial absorbent composition comprising water, the unreacted amine mixture may be present, for example, in an amount ranging from 5 to 70 wt %, the additive may be present in an amount ranging from about 5 to 40 wt %, calculated as the amine mixture, the balance being water and all said weights being based on the weight of the total liquid absorbent composition.

The liquid medium in which amine mixture and additive are contained prior to use may be water, an organic solvent and mixtures thereof. Preferably, the liquid medium comprises water.

Suitable organic solvents include physical absorbents (as opposed to chemical absorbents) such as those described in U.S. Pat. No. 4,112,051, the teachings of which are hereby incorporated by reference and may be, for example, aliphatic acid amides, N-alkylated pyrrolidones, sulfones, sulfoxides, glycols and the mono- and di-ethers thereof. The preferred physical absorbents are sulfones, preferably sulfolane. If a mixture of solvent and water is used as the liquid medium, a typical amount of solvent may range from 0.1 to 5 moles per liter of total absorbent composition, preferably from about 0.5 to 3 moles per liter, depending upon the particular components used.

The absorbent composition of the present invention may include a wide range of additives typically employed in selective gas removal processes, such as antifoaming agents, antioxidants, corrosion inhibitors and the like in an effective amount.

Three characteristics which are of ultimate importance in determining the effectiveness of the amine absorbent solutions herein for $H_2S$ removal are "selectivity", "loading" and "capacity". The term "selectivity" as used throughout the specification is defined as the following mole ratio fraction:

$$\frac{\text{(moles of } H_2S/\text{moles of } CO_2) \text{ in liquid phase}}{\text{(moles of } H_2S/\text{moles of } CO_2) \text{ in gaseous phase}}$$

The higher this fraction, the greater is the selectivity of the absorbent solution for the $H_2S$ in the gas mixture.

By the term "loading" is meant the concentration of the $H_2S$ gas physically dissolved and chemically combined in the absorbent solution as expressed in weight percent of the solution. The best solutions are those which exhibit good selectivity up to a relatively high loading level. The solutions used in the practice of the present invention typically have a "selectivity" of not substantially less than 10 at a "loading" of 0.2 wt. % $H_2S$, preferably, a "selectivity" of not substantially less than 10 at a loading of 0.4 wt. % $H_2S$ or more.

"Capacity" is defined as the moles or weight percent of $H_2S$ loaded in the absorbent solution at the end of the absorption step minus the moles or weight percent of $H_2S$ loaded in the absorbent solution at the end of the desorption step. High capacity enables one to reduce the amount of absorbent solution to be circulated and use less heat or steam during regeneration.

The acid gas mixture herein necessarily includes $H_2S$, and may optionally include other gases such as $CO_2$, $N_2$, $CH_4$, $H_2$, $CO$, $COS$, $HCN$, $C_2H_4$, $NH_3$, and the like. Often such gas mixtures are found in combustion gases, refinery gases, town gas, natural gas, syn gas, water gas, propane, propylene, heavy hydrocarbon gases, etc. The absorbent solution herein is particularly effective when the gaseous mixture is a gas, obtained, for example, from shale oil retort gas, coal or gasification of heavy oil with air/steam or oxygen/steam, thermal conversion of heavy residual oil to lower molecular weight liquids and gases, or in sulfur plant tail gas clean-up operations.

The absorption step of this invention generally involves contacting the gaseous stream with the absorbent solution in any suitable contacting vessel. In such processes, the normally gaseous mixture containing $H_2S$ and $CO_2$ from which the $H_2S$ is to be selectively removed may be brought into intimate contact with the absorbent solution using conventional means, such as a tower or vessel packed with, for example, rings or with sieve plates, or a bubble reactor.

In a typical mode of practicing the invention, the absorption step is conducted by feeding the normally gaseous mixture into the lower portion of the absorption tower while fresh absorbent solution is fed into the upper region of the tower. The normally gaseous mixture, freed largely from the $H_2S$, emerges from the upper portion of the tower, and the loaded absorbent solution, which contains the selectively absorbed $H_2S$, leaves the tower near or at its bottom. Preferably, the inlet temperature of the absorbent solution during the absorption step is in the range of from about 20° to about 100° C., and more preferably from 40° to about 60° C. Pressures may vary widely; acceptable pressures are between 5 and 2000 psia, preferably 20 to 1500 psia, and most preferably 25 to 1000 psia in the absorber. The contacting takes place under conditions such that the $H_2S$ is selectively absorbed by the solution. The absorption conditions and apparatus are designed so as to minimize the residence time of the liquid in the absorber to reduce $CO_2$ pickup while at the same time maintaining sufficient residence time of gas mixture with liquid to absorb a maximum amount of the $H_2S$ gas. The amount of liquid required to be circulated to obtain a given degree of $H_2S$ removal will depend on the chemical structure and basicity of the amino compound and on the partial pressure of $H_2S$ in the feed gas. Gas mixtures with low partial pressures such as those encountered in thermal conversion processes will require less liquid under the same absorption conditions than gases with higher partial pressures such as shale oil retort gases.

A typical procedure for the selective $H_2S$ removal phase of the process comprises selectively absorbing $H_2S$ via countercurrent contact of the gaseous mixture containing $H_2S$ and $CO_2$ with the absorbent solution in a column containing a plurality of trays at a low temperature, e.g., below 45° C., and at a gas velocity of at least about 0.3 ft/sec (based on "active" or aerated tray surface), depending on the operating pressure of the gas, said tray column having fewer than 20 contacting trays, with, e.g., 4-16 trays being typically employed.

After contacting the normally gaseous mixture with the absorbent solution, which becomes saturated or partially saturated with $H_2S$, the solution may be at least partially regenerated so that it may be recycled back to the absorber. As with absorption, the regeneration may take place in a single liquid phase. Regeneration or desorption of the acid gases from the absorbent solution may be accomplished by conventional means such as pressure reduction of the solution or increase of temperature to a point at which the absorbed $H_2S$ flashes off, or by passing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from about 50° to about 170° C., and preferably from about 80° to 120° C., and the pressure of the solution on regeneration should range from about 0.5 to 100 psia, preferably 1 to about 50 psia. The absorbent solution, after being cleansed of at least a portion of the $H_2S$ gas, may be recycled back to the absorbing vessel. Makeup absorbent may be added as needed.

In the preferred regeneration technique, the $H_2S$-rich solution is sent to the regenerator wherein the absorbed components are stripped by the steam which is generated by reboiling the solution. Pressure in the flash drum and stripper is usually 1 to about 50 psia, preferably 15 to about 30 psia, and the temperature is typically in the range from about 50° to 170° C., preferably about 80° to 120° C. Stripper and flash temperatures will, of course, depend on stripper pressure; thus at about 15 to 30 psia stripper pressures, the temperature will be about 80° to about 120° C. during desorption. Heating of the solution to be regenerated may very suitably be effected by means of indirect heating with low-pressure steam. It is also possible, however, to use direct injection steam.

Figure 1:
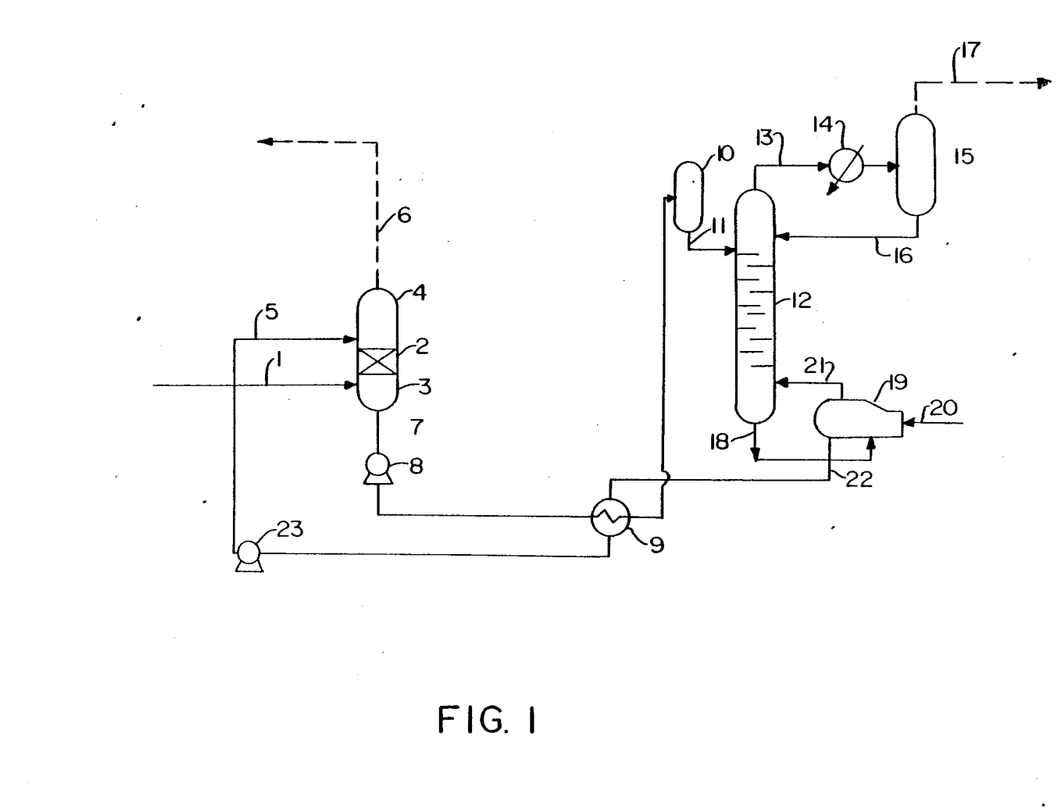
FIG. 1 is a diagrammatic flow sheet illustrating an absorption-regeneration unit for selective removal of $H_2S$ from gaseous streams containing $H_2S$ and $CO_2$.

In one embodiment for practicing the entire process herein, as illustrated in FIG. 1, the gas mixture to be purified is introduced through line 1 into the lower portion of a gas-liquid countercurrent contacting column 2, said contacting column having a lower section 3 and an upper section 4. The upper and lower sections may be segregated by one or a plurality of packed beds as desired. The absorbent solution as described above is introduced into the upper portion of the column through a pipe 5. The solution flowing to the bottom of the column encounters the gas flowing countercurrently and dissolves the $H_2S$ preferentially. The gas freed from most of the $H_2S$ exits through a pipe 6 for final use. The solution, containing mainly $H_2S$ and some $CO_2$, flows toward the bottom portion of the column, from which it is discharged through pipe 7. The solution is then pumped via optional pump 8 through an optional heat exchanger and cooler 9 disposed in pipe 7, which allows the hot solution from the regenerator 12 to exchange heat with the cooler solution from the absorber column 2 for energy conservation. The solution is entered via pipe 7 to a flash drum 10 equipped with a line (not shown) which vents to line 13 and then introduced by pipe 11, into the upper portion of the regenerator 12, which is equipped with several plates and effects the desorption of the $H_2S$ and $CO_2$ gases carried along in the solution. This acid gas mixture is passed through a pipe 13 into a condenser 14 wherein cooling and condensation of water and amine solution from the gas occur. The gas then enters into a separator 15 where further condensation is effected. The condensed solution is returned through pipe 16 to the upper portion of the regenerator 12. The gas remaining from the condensation, which contains $H_2S$ and some $CO_2$, is removed through pipe 17 for final disposal (e.g., to a vent or incinerator or an apparatus which converts the $H_2S$ to sulfur, such as a Claus unit or a Stretford conversion unit (not shown)).

The solution is liberated from most of the gas which it contains while flowing downward through the regenerator 12 and exits through pipe 18 at the bottom of the regenerator for transfer to a reboiler 19. Reboiler 19, equipped with an external source of heat (e.g. steam injected through pipe 20), vaporizes a portion of this solution (mainly water) to drive further $H_2S$ therefrom. The $H_2S$ and steam driven off are returned via pipe 21 to the lower section of the regenerator 12 and exited through pipe 13 for entry into the condensation stages of gas treatment. The solution remaining in the reboiler 19 is drawn through pipe 22, cooled in heat exchanger 9, and introduced via the action of pump 23 (optional if pressure is sufficiently high) through pipe 5 into the absorber column 2.

The invention is illustrated further by the following examples, which, however, are not to be taken as limiting in any respect. All parts and percentages, unless expressly stated to be otherwise, are by weight.

EXAMPLE 1

Selective $H_2S$ Removal from a Mixture Containing $H_2S$ and $CO_2$

Figure 2:
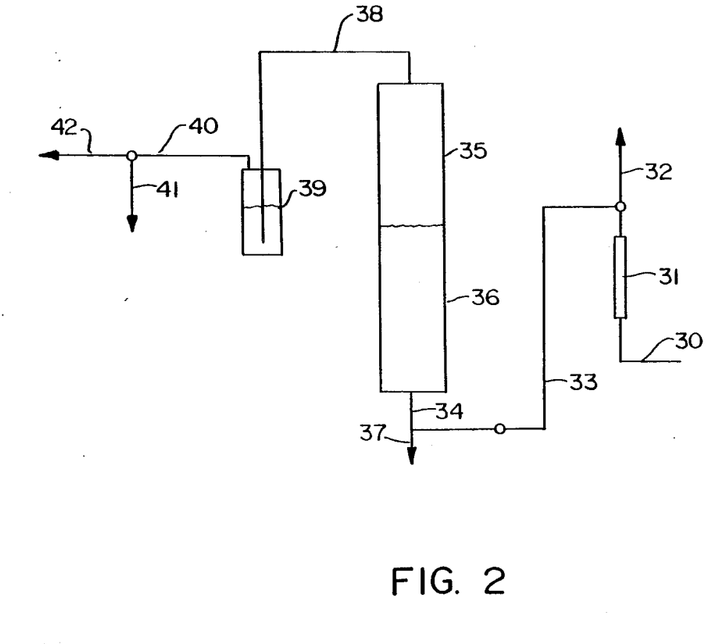
FIG. 2 is a diagrammatic flow sheet illustrating a sparged absorber unit for use in rapid determination of the selectivity of the amino compound for selective removal of $H_2S$ from gaseous streams containing $H_2S$ and $CO_2$.

FIG. 2 illustrates the sparged absorber unit, operated on a semibatch mode, used to evaluate the selectivity of $H_2S$ removal of the amino compounds of the invention herein. A gas mixture comprised of 10% $CO_2$, 1% $H_2S$ and 89% $N_2$ expressed in the volume percent, respectively, was passed from a gas cylinder (not shown) through line 30 to a meter 31 measuring the rate at which the gas is fed to the absorber. For all examples this rate was 3.5 liters per minute. The gas was then passed through line 32 to a gas chromatography column (not shown) continuously monitoring the composition of the inlet gas and through lines 33 and 34 to a sparged absorber 35, which is a cylindrical glass tube 45 cm high and 3.1 cm in diameter charged with 100 ml of the amine absorbent solution 36. The gas was passed through the solution at a solution temperature of 40° C., and about 5 ml samples of the solution were periodically removed from the bottom of the absorber unit through lines 34 and 37 to be analyzed for $H_2S$ and $CO_2$ content. The $H_2S$ content in the liquid sample was determined by titration with silver nitrate. The $CO_2$ content of the liquid sample was analyzed by acidifying the sample with an aqueous solution of 10% HCl and measuring the evolved $CO_2$ by weight gain on NaOH-coated asbestos.

While the solution was being periodically withdrawn from the bottom of the absorber unit, the gas mixture was removed from the top thereof via line 38 to a trap 39 which served to scrub out any $H_2S$ in the outlet gas. The resulting gas could optionally then be passed via lines 40 and 41 for final disposal or via line 42 to a gas chromatography column (not shown) for periodic evaluation of the composition of the outlet gas to check for system leaks. For purposes of the examples, the $H_2S$ and $CO_2$ contents of the inlet gas phase were measured and the $H_2S$ and $CO_2$ contents of the liquid phase were determined as described above. These data were used to calculate selectivity values of the amine as defined above, which were plotted as a function of the loading of the absorbent solution in units of weight percent of $H_2S$ in solution.

Figure 3:
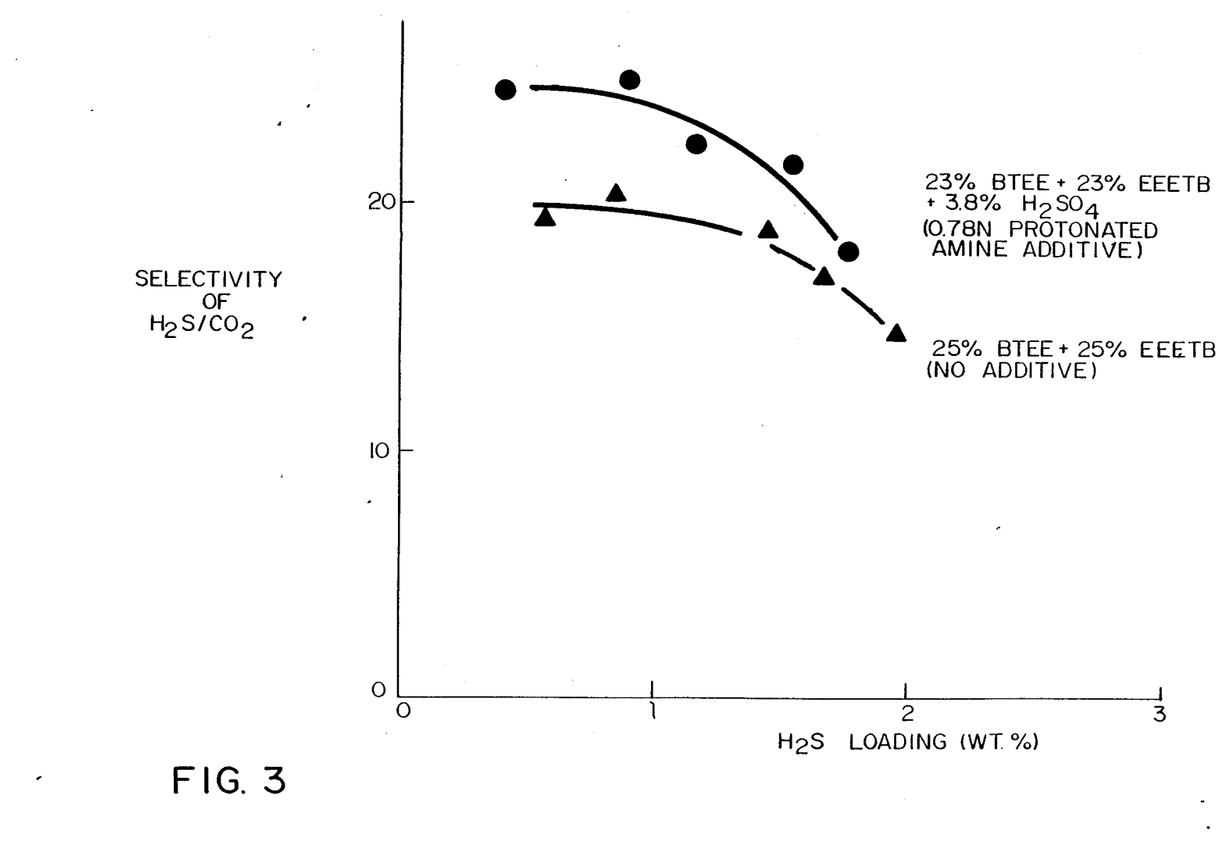
FIG. 3 shows that addition of sulfuric acid to bis(tertiarybutylaminoethoxy)-ethane (BTEE)/ethoxyethoxyethanol-tertiarybutylamine(EEETB) increases selectivity for $H_2S$.

In this example the absorbent solution contained 23 wt % of bis(tertiarybutylaminoethoxy)-ethane (BTEE) and 23 wt % of ethoxyethoxyethanol-tertiarybutylamine (EEETB), to which 3.8 wt % of $H_2SO_4$ was added. The resulting solution had a 2.87N total amine concentration; the protonated amine concentration was 0.78N, corresponding to 27% (in terms of equivalents) of the total amine concentration. The selectivity plot is shown in FIG. 3, a solution containing 25 wt % of BTEE and 25 wt % of EEETB without additive is also shown. The figure shows that addition of sulfuric acid increased selectivity for $H_2S$.

EXAMPLE 2

Figure 4:
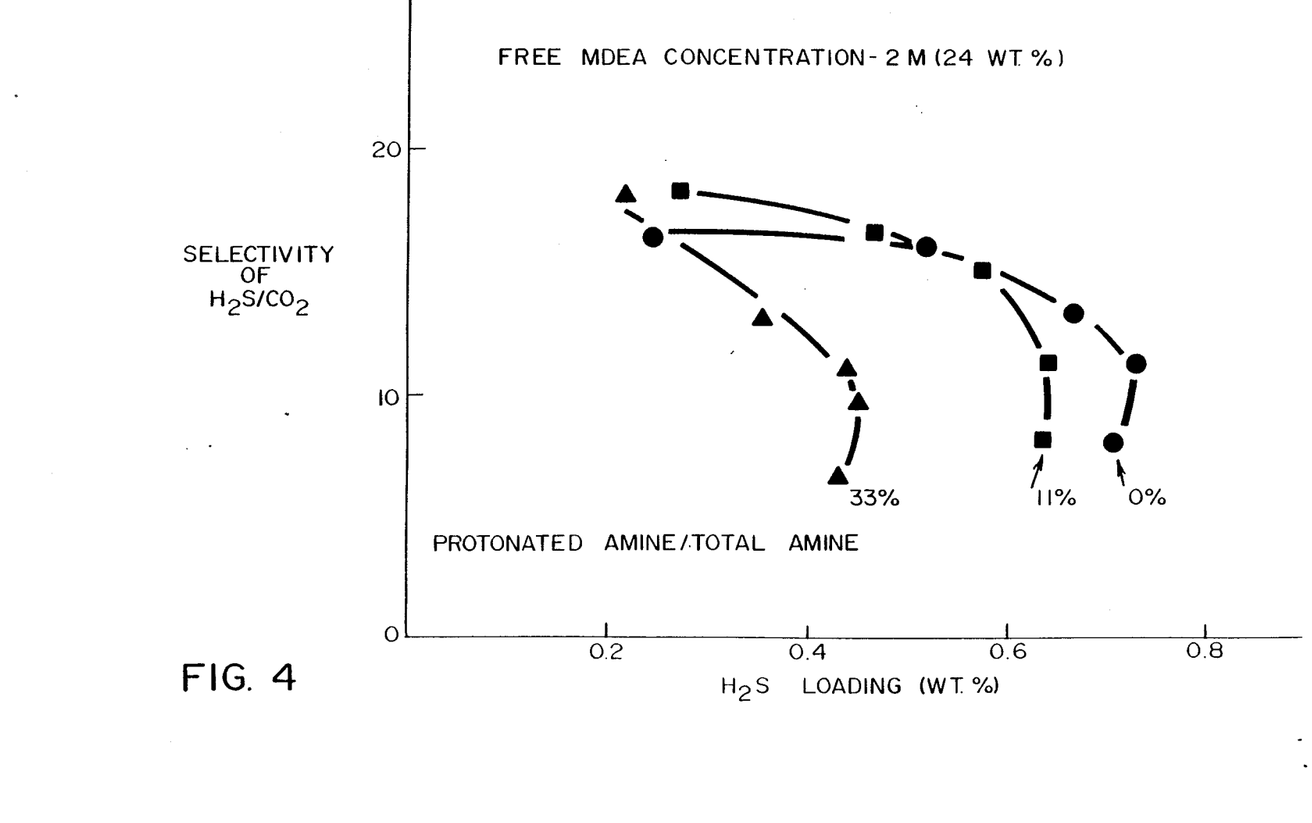
FIG. 4 shows that addition of N-methyldiethanolamine (MDEA) sulfate to MDEA leads to a decrease in capacity.

The comparative example shows that adding to the conventional N-methyldiethanolamine (MDEA) its salt with a strong acid led to a decrease in capacity. Above a certain level of additive, the decrease in capacity can be significant. The absorption apparatus was the sparged absorber unit, which was the same as described in Example 1. Three solutions were tested. The first contained 24 wt % of MDEA, corresponding to a 2M concentration. The second solution had the same concentration of free amine, but enough MDEA $(H_2SO_4)_{0.5}$ was added to have protonated amine to total amine ratio of 0.11. The third solution had the same concentration of free amine, but enough MDEA $(H_2SO_4)_{0.5}$ was added to have a protonated amine to total amine ratio of 0.33. FIG. 4 shows that at a protonated amine/total amine ratio of 0.11, the capacity was lower than that with no additive. At a protonated amine/total amine ratio of 0.33, a drastic decrease in capacity occurred without any significant improvement in selectivity.

EXAMPLE 3

Figure 5:
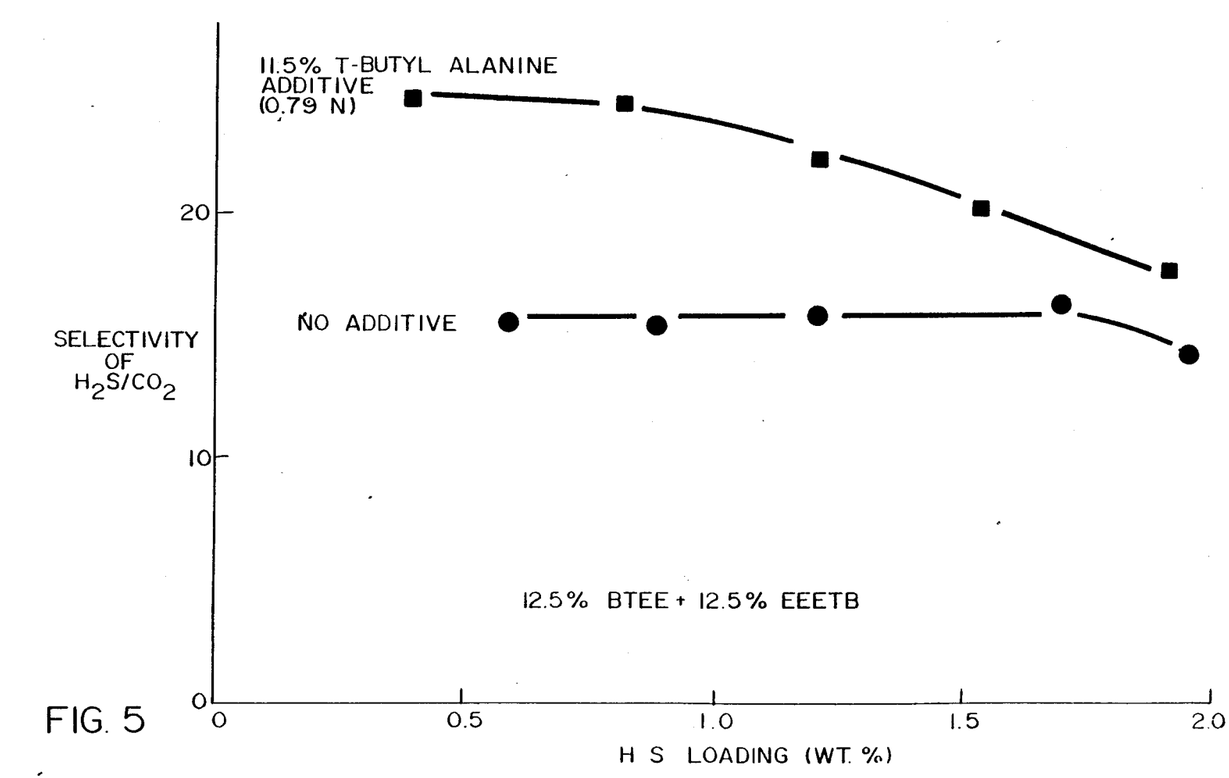
FIG. 5 shows that addition of the severely hindered amino acid N-tertiarybutylalanine to BTEE/EEETB leads to an increase in selectivity for $H_2S$.

This example shows the effect of the addition of a severely hindered aminoacid to a BTEE/EEETB solution. The absorption apparatus was the sparged absorber unit, which was the same as that described in Example 1. Two solutions were tested. One contained 12.5 wt % each of BTEE and EEETB. The other contained, in addition, 11.5 wt % of N-tertiarybutylalanine. FIG. 5 shows that the addition of the severely hindered aminoacid improved the selectivity for $H_2S$.

EXAMPLE 4

Figure 6:
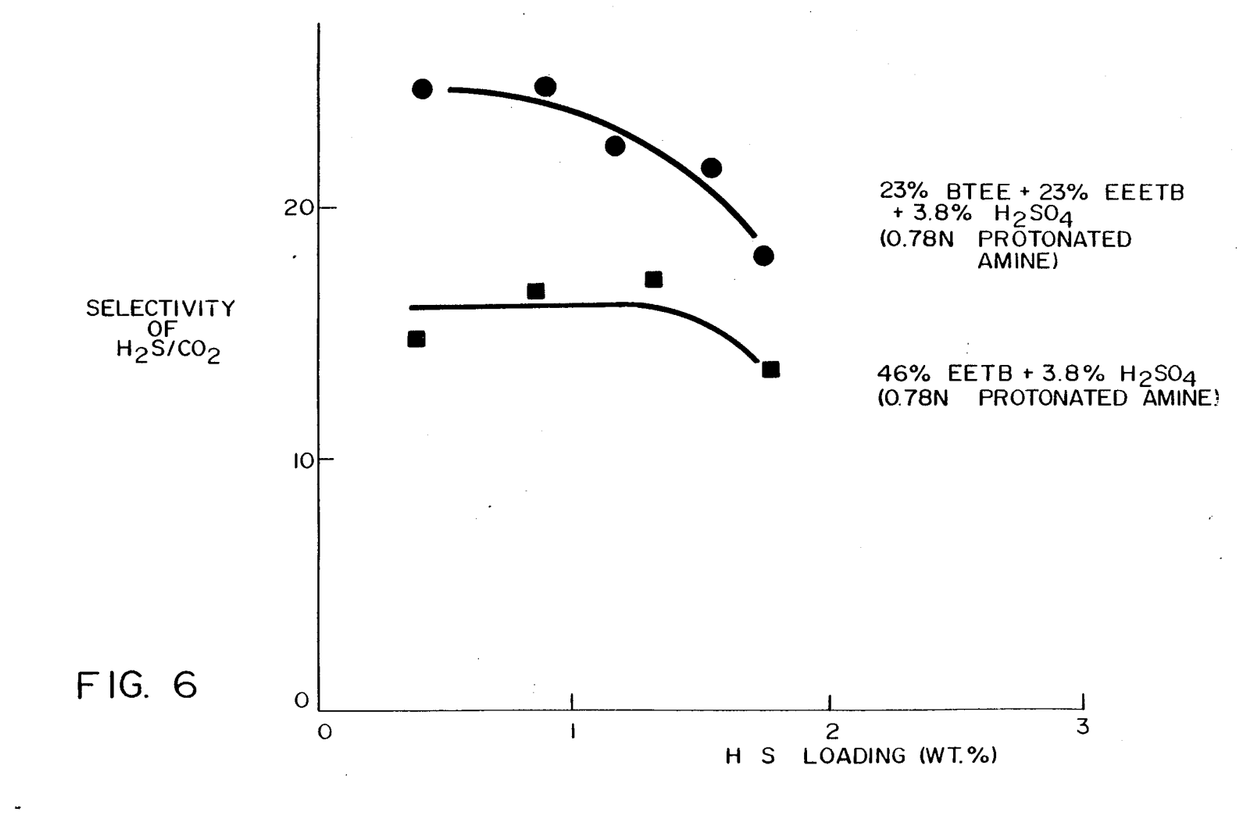
FIG. 6 shows that the selectivity for BTEE/EEETB+$H_2SO_4$ is higher than that for ethoxyethanol-tertiarybutylamine (EETB)+$H_2SO_4$ at the same concentrations of amine and $H_2SO_4$.

This example shows that the selectivity of BTEE/EEETB to which $H_2SO_4$ was added was higher than that for the solution of ethoxyethanol-tertiarybutylamine (EETB) to which the same amount of $H_2SO_4$ was added. Two solutions were tested in the sparged absorber unit, which was the same as that described in Example 1. The first solution contained 23 wt % of BTEE, 23 wt % of EEETB and 3.8 wt % of $H_2SO_4$. The second solution contained 46 wt % of EETB and 3.8 wt % of $H_2SO_4$. In each case the concentration of protonated amine was 0.78N. FIG. 6 shows the BTEE/EEETB solution had a higher selectivity.

EXAMPLE 5

Figure 7:
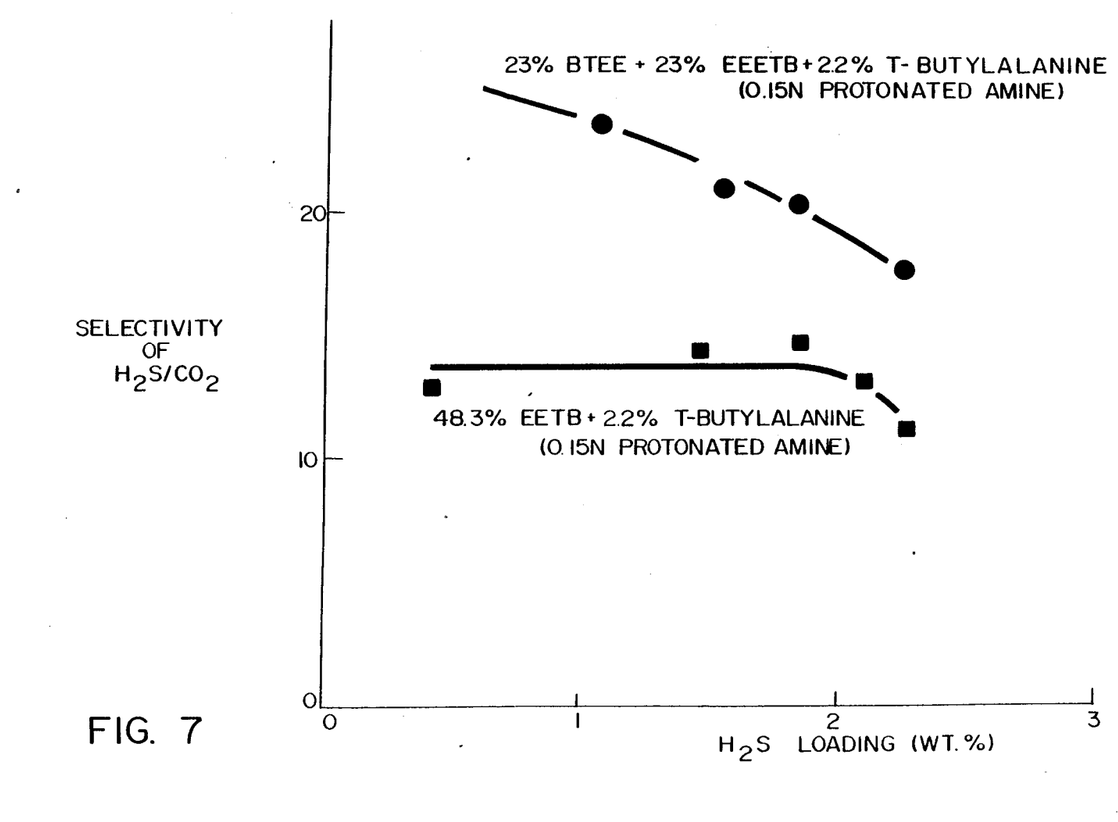
FIG. 7 shows that BTEE/EEETB+N-tertiarybutylalanine has a higher selectivity for $H_2S$ than EETB+N-tertiarybutylalanine at the same amino acid concentration.

The absorption apparatus was the sparged absorber unit, which was the same as that described in Example 1. Two solutions were tested; the first contained 23 wt % of BTEE, 23 wt % of EEETB and 2.2 wt % of N-tertiarybutylalanine; the second solution contained 48 wt % of ethoxyethanol-tertiarybutylamine (EETB) and 2.2 wt % of N-tertiarybutylalanine. FIG. 7 shows that the BTEE/EEETB solution had a better selectivity for $H_2S$ than the EETB solution.

EXAMPLE 6

Figure 8:
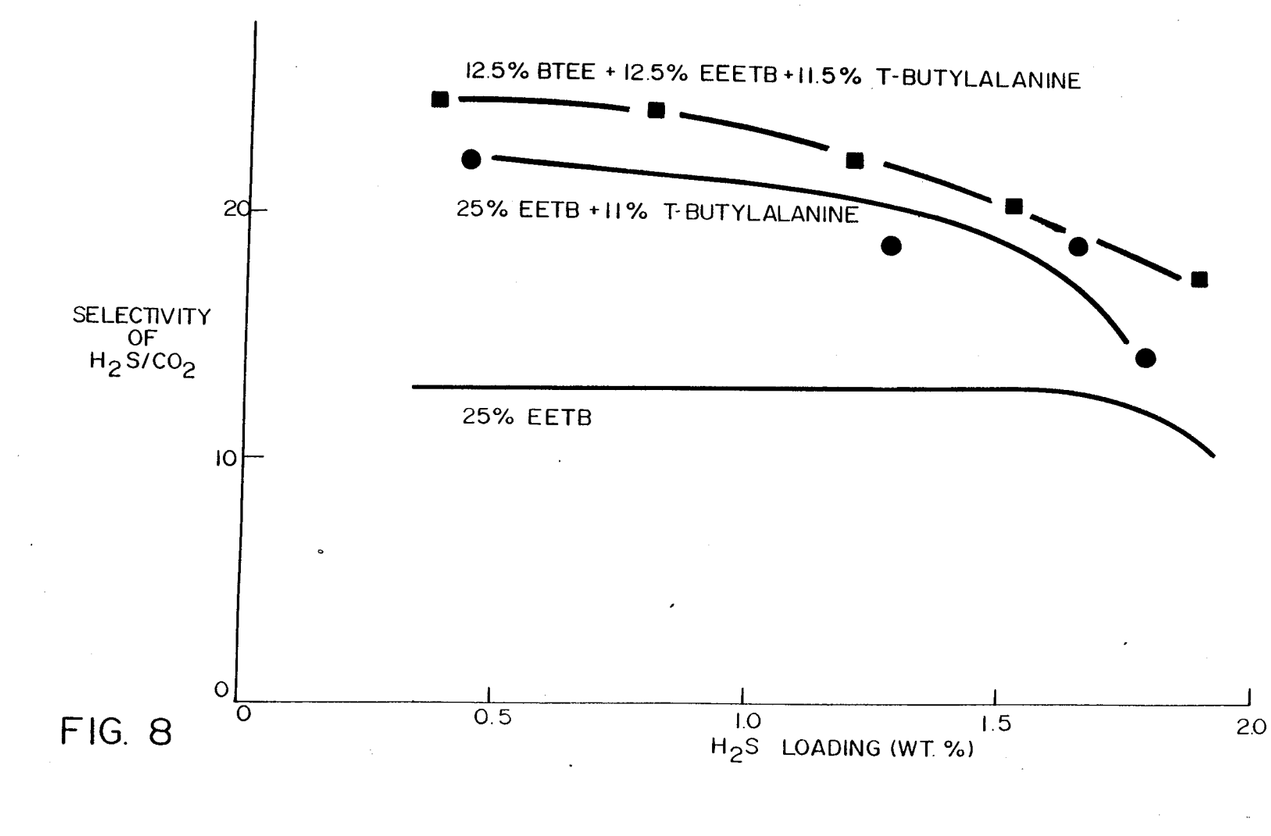
FIG. 8 shows that BTEE/EEETB+N-tertiarybutylalanine leads to a better selectivity than EETB +N-tertiarybutylalanine, which has a higher selectivity than EETB alone; the comparisons are made at the same concentrations of free amine.

This example is similar to Example 7. Three solutions were compared. One contained 12.5 wt % of BTEE, 12.5 wt % of EEETB and 11.5 wt % of N-tertiarybutylalanine. The second solution contained 25 wt % of ethoxyethanol-tertiarybutylamine (EETB) and 11 wt % of N-tertiarybutylalanine; the third solution contained 25 wt % of EETB. FIG. 8 shows that the BTEE/EEETB/N-tertiarybutylalanine solution had the highest selectivity.

EXAMPLE 7

Figure 9:
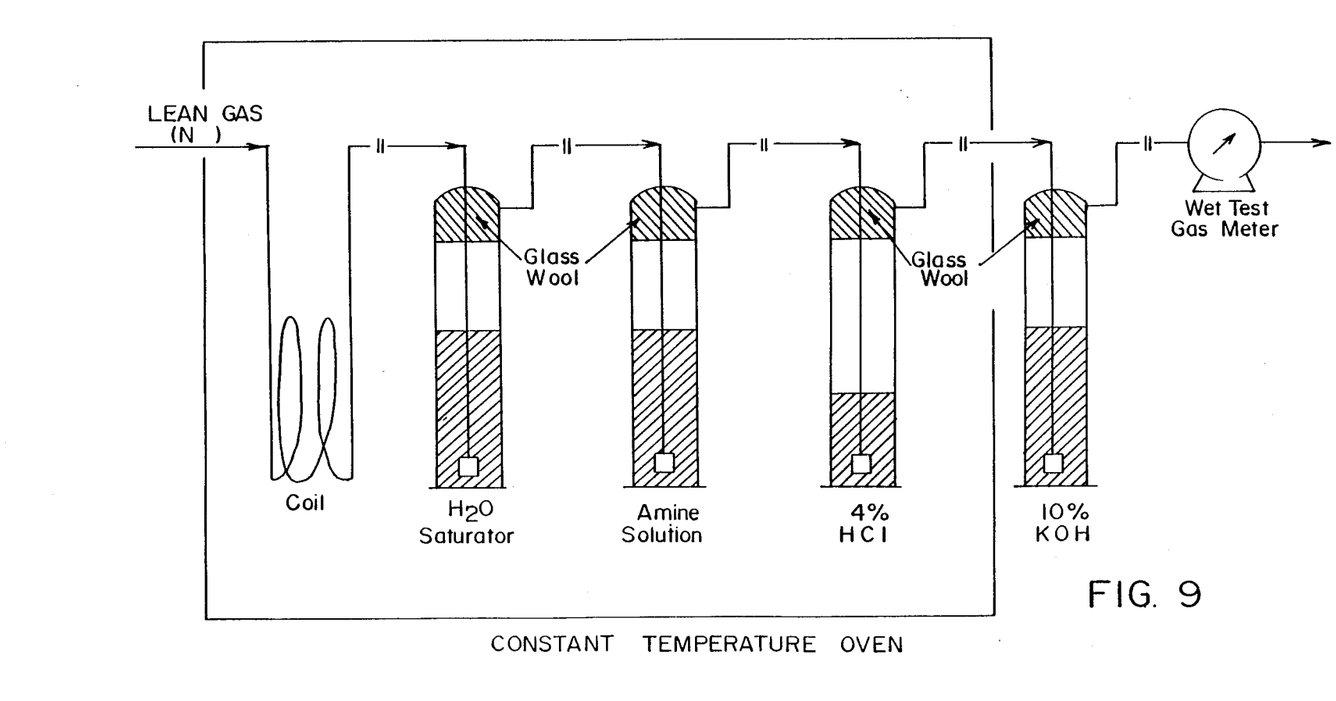
FIG. 9 shows the apparatus used for volatility tests.
Figure 10:
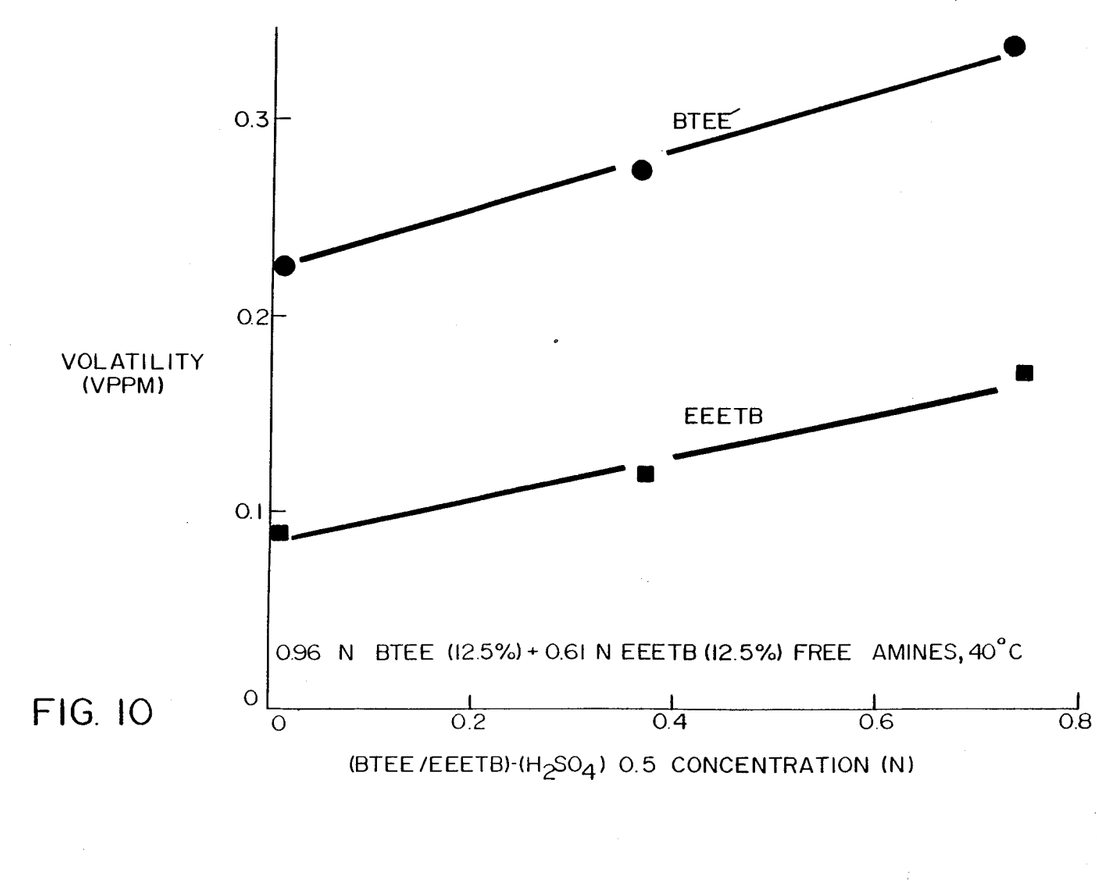
FIG. 10 shows the effect of the addition of BTEE/EEETB sulfate to BTEE/EEETB on the volatilities of the two amines. They both increase with the increase in sulfate concentration, but remain quite low.
Figure 11:
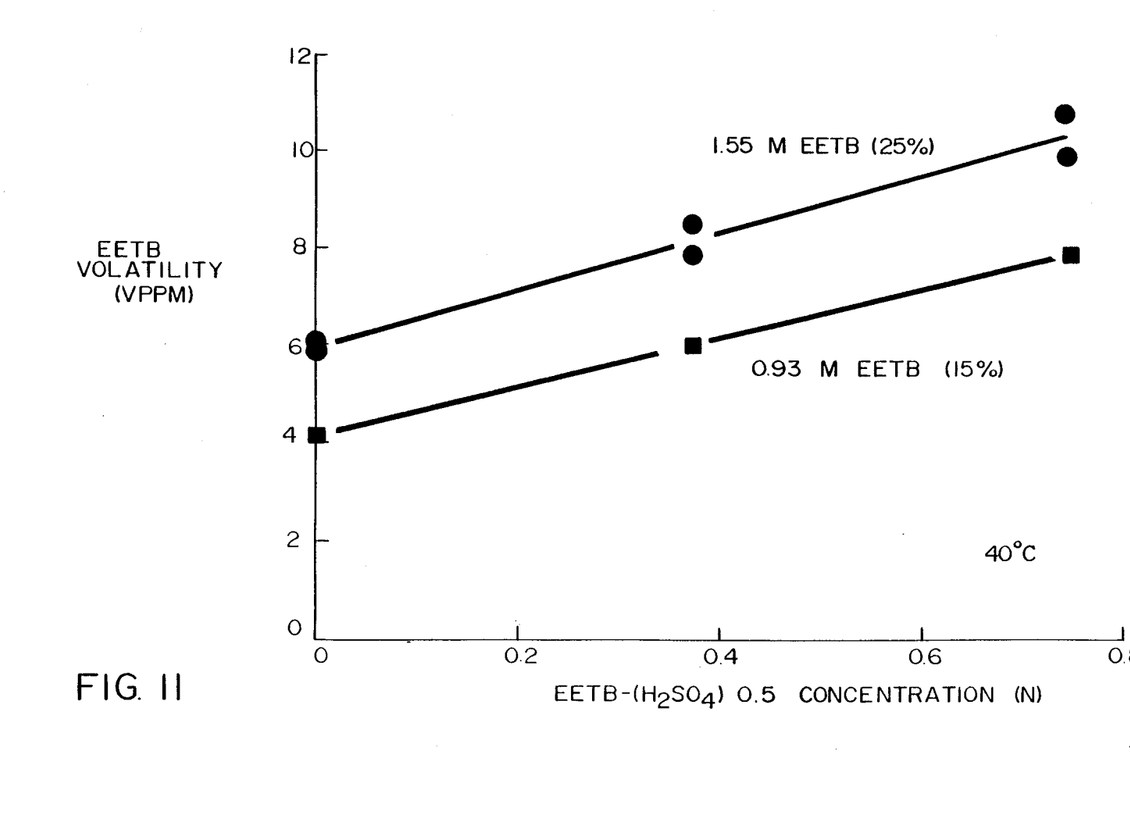
FIG. 11 shows the effect of the addition of EETB sulfate to EETB on the volatility. Comparison with FIG. 10 shows that BTEE and EEETB are less volatile than EETB.

This example shows that BTEE and EEETB have a lower volatility than ethoxyethanol-tertiarybutylamine (EETB). The volatility measuring apparatus is shown schematically in FIG. 9. This apparatus consisted of the following six parts in series for the flow of nitrogen gas: (1) s.s. tubing coil to equilibrate the $N_2$ gas to the set temperature, (2) $H_2O$ saturator to saturate the $N_2$ gas with water vapor, (3) bubbler containing the amine solution for testing, which saturated the $N_2$ gas with the amine, (4) bubbler containing 4% HCl solution to remove the amine from the $N_2$ gas, (5) bubbler containing 10% KOH to remove any trace HCl from the $N_2$ gas, and (6) wet-test gas meter to measure the total volume of the $N_2$ gas passing through the system for the experiment. The first four parts were in a constant temperature oven. The $N_2$ gas flow rate was 0.5 liter/min. The volatility for the amine solution was obtained from the amount of the amine trapped in the HCl solution and the volume of the $N_2$ gas measured by the wet-test meter. The amount of the amine in the HCl solution was determined by the following procedure: (1) neutralize the solution with 50% KOH to a pH value of about 6, (2) saturate the solution with $K_2CO_3$, (3) extract the aqueous phase with isopropanol, (4) separate and recover the isopropanol phase and dry it over $Na_2SO_4$, and (5) analyze the concentration of the amine in the isopropanol phase by gas chromatography. FIG. 10 shows the volatility results obtained with BTEE and EEETB at 40° C. The concentration of each amine in the free form was 12.5 wt %, corresponding to 0.96N BTEE and 0.61N EEETB. Adding (BTEE/EEETB) sulfate caused an increase in volatility. Comparison with FIG. 11 shows that the volatilities of BTEE and EEETB were lower than that of ethoxyethanoltertiarybutylamine (EETB) with or without additive (at both unreacted EETB concentrations of 25% and 15%).

EXAMPLE 8

The reaction apparatus was a one-liter, four-neck flask, equipped with a thermometer, a reflux condenser, a magnetic stirrer and a three-way stopcock.

23 g of BTEE, 23 g of EEETB, 3.8 g of $H_2SO_4$ and 50.2 g of water were put into the flask. The flask was evacuated from the top of the reflux condenser until the solution began to boil. Then a plastic bag full of $H_2S$ was attached to the three-way stopcock and $H_2S$ was admitted into the flask. When absorption stopped, a sample of solution was taken and analyzed for $H_2S$ content. The result was 7.2 wt % $H_2S$, equivalent to 1.06 moles of $H_2S$ per mole of free amino group. Then the $H_2S$ bag was disconnected. The solution was refluxed for three hours and then allowed to cool under nitrogen. A sample was taken and analyzed for $H_2S$ content. The result was 0.007% $H_2S$, which corresponded to 0.001 moles of $H_2S$ per mole of free amino group.

The experiment was repeated without adding $H_2SO_4$. The rich solution contained 9.3% of $H_2S$, corresponding to 1.04 moles of $H_2S$ per mole of amino group. The lean solution contained 0.057% of $H_2S$, corresponding to 0.006 moles of $H_2S$ per mole of amino group. These experiments showed that addition of $H_2SO_4$ lowered the lean loading, without affecting the rich loading.

What is claimed is:

1. An absorbent composition comprising:
(1) a first severely hindered amine with the formula:

(2) a second severely hindered amine with the formula:

with x being an integer ranging from 2 to 6 and the weight ratio, in the mixture, of the first amine to the second amine ranging from 0.43:1 to 2.3:1, (3) and an additive including:
(a) an amine salt, said amine salt being the reaction product of a severely hindered amino compound having a cumulative $-E_s$ value greater than 1.75, and a component selected from the group consisting of an acid having at least one pKa of not more than about 7, a decomposable salt of an acid having at least one pKa of not more than 7, a compound capable of forming an acid having a pKa of not more than about 7 and mixtures thereof, said amine salt and said severely hindered amine mixture of (1) and (2) being present in said absorbent composition in a mole ratio of said amine salt to said severely hindered amine mixture of (1) and (2) of at least about 0.2:1, when said amine salt is present and/or
(b) an aminoacid, said aminoacid being a severely hindered aminoacid having a cumulative $-E_s$ value greater than 1.75, said aminoacid and said severely hindered amine mixture being present in said absorbent composition in a mole ratio of said aminoacid to said severely hindered amine mixture of at least about 0.01:1 when said aminoacid is present.

2. The absorbent composition of claim 1 wherein said absorbent composition additionally comprises a liquid selected from the group consisting of water, an organic solvent and mixtures thereof.

3. The absorbent composition of claim 1 wherein said severely hindered amino compound of said amine salt is selected from the group consisting of a secondary amino ether alcohol, a di-secondary amino ether, and mixtures thereof.

4. The absorbent composition of claim 1 wherein said component reacted with said severely hindered amino compound is selected from the group consisting of sulfuric acid, phosphoric acid, phosphorous acid, pyrophosphoric acid, sulfurous acid, and mixtures thereof.

5. The absorbent composition of claim 1 wherein said component reacted with said severely hindered amino compound is selected from the group consisting of ammonium sulfate, ammonium sulfite, sulfur dioxide, ammonium phosphate and mixtures thereof.

6. The absorbent composition of claim 1 wherein said severely hindered aminoacid is selected from N-tertiarybutylalanine, N-tertiarybutylglycine, and their mixture.

7. The absorbent composition of claim 1 wherein said mole ratio of said amine salt or said aminoacid to said severely hindered amine mixture ranges from about 0.2:1 to 4:1.

8. The absorbent composition of claim 1 wherein said mole ratio of said amine salt or said aminoacid to said severely hindered amine mixture ranges from about 0.2:1 to 1:1.

9. The absorbent composition of claim 1 wherein said mole ratio of said amine salt or said aminoacid to said severely hindered amine mixture ranges from about 0.3:1 to 1:1.

10. The absorbent composition of claim 1 wherein said absorbent composition comprises water and wherein said amine salt is a non-volatile water soluble amine salt.

11. The composition of claim 1 wherein said first amine is:

12. The composition of claim 1 wherein said second amine is:

* * * * *